(12) United States Patent
Blaser et al.

(10) Patent No.: US 9,982,752 B2
(45) Date of Patent: May 29, 2018

(54) ENERGY GUIDING CHAINS FOR PROCESSING MACHINES

(71) Applicant: TRUMPF Laser- und Systemtechnik GmbH, Ditzingen (DE)

(72) Inventors: Martin Blaser, Vogt (DE); Gunter Fischer, Moensheim (DE); Joerg Mueller, Tiefenbronn (DE)

(73) Assignee: TRUMPF Laser—und Systemtechnik GmbH, Ditzingen (DE)

( * ) Notice: Subject to any disclaimer, the term of this patent is extended or adjusted under 35 U.S.C. 154(b) by 0 days. days.

(21) Appl. No.: 15/678,693

(22) Filed: Aug. 16, 2017

(65) Prior Publication Data

US 2017/0343079 A1    Nov. 30, 2017

Related U.S. Application Data

(63) Continuation of application No. PCT/EP2016/053565, filed on Feb. 19, 2016.

(30) Foreign Application Priority Data

Feb. 20, 2015    (DE) .................. 10 2015 203 073

(51) Int. Cl.
*F16G 13/16*    (2006.01)
*H02G 11/00*    (2006.01)

(52) U.S. Cl.
CPC ........... *F16G 13/16* (2013.01); *H02G 11/006* (2013.01)

(58) Field of Classification Search
CPC .............................. F16G 13/16; H02G 11/006
USPC .......................................................... 59/78.1
See application file for complete search history.

(56) References Cited

U.S. PATENT DOCUMENTS

| | | | |
|---|---|---|---|
| 3,330,105 A * | 7/1967 | Weber | ............... B23Q 1/0009 |
| | | | 138/120 |
| 3,770,022 A | 11/1973 | Beisemann | |
| 3,921,388 A | 11/1975 | Loos et al. | |
| 4,084,370 A * | 4/1978 | Moritz | .................. F16G 13/16 |
| | | | 248/49 |
| 4,104,871 A | 8/1978 | Moritz | |
| 4,672,805 A | 6/1987 | Moritz | |

(Continued)

FOREIGN PATENT DOCUMENTS

| | | |
|---|---|---|
| DE | 7624623 U1 | 11/1976 |
| DE | 2622006 A1 | 11/1977 |

(Continued)

OTHER PUBLICATIONS

International Search Report from PCT Application No. PCT/EP2016-053565, dated Jun. 6, 2016, 5 pages.

*Primary Examiner* — David B Jones
(74) *Attorney, Agent, or Firm* — Fish & Richardson P.C.

(57) ABSTRACT

An energy guiding chain has a plurality of articulately interconnected chain links comprising two outermost links and a plurality of inner links, and a bendable cover strip covering at least one of two sides of the articulately interconnected chain links, wherein the cover strip is held by at least some of the inner chain links, and guided displaceably with respect to at least the inner chain links in a chain longitudinal direction, and wherein the cover strip projects in a chain transverse direction at least on one side over the chain links. A processing machine for the machining of workpieces and a method of using an energy guiding chain are also described.

14 Claims, 3 Drawing Sheets

(56) References Cited

U.S. PATENT DOCUMENTS

| | | | |
|---|---|---|---|
| 4,702,281 A | | 10/1987 | Moritz |
| 6,107,565 A | * | 8/2000 | O'Rourke ............ H02G 11/006 174/101 |
| 6,423,901 B2 | | 7/2002 | Richter |
| 6,796,409 B2 | | 9/2004 | Hermey et al. |
| 9,222,601 B2 | | 12/2015 | Fischer |
| 2013/0075129 A1 | | 3/2013 | Kaihotsu et al. |

FOREIGN PATENT DOCUMENTS

| | | |
|---|---|---|
| DE | 2360227 | 10/1980 |
| DE | 3537961 C1 | 4/1987 |
| DE | 19719227 C1 | 1/1999 |
| DE | 19839966 A1 | 4/2000 |
| DE | 20101656 U1 | 5/2001 |
| DE | 102013226954 A1 | 6/2015 |
| EP | 0192853 B1 | 2/1991 |
| JP | S608543 A | 1/1985 |
| KR | 10200803407 | 4/2008 |
| KR | 20080034071 A | 4/2008 |

\* cited by examiner

ENERGY GUIDING CHAINS FOR PROCESSING MACHINES

CROSS-REFERENCE TO RELATED APPLICATIONS

This application is a continuation of and claims priority under 35 U.S.C. § 120 from PCT Application No. PCT/EP2016/053565 filed on Feb. 19, 2016, which claims priority from German Application No. 10 2015 203 073.3, filed on Feb. 20, 2015. The entire contents of each of these priority applications are incorporated herein by reference.

TECHNICAL FIELD

The invention relates to an energy guiding chain having a plurality of articulately interconnected chain links.

BACKGROUND

Energy guiding chains having a steel strip cover are marketed, for example, by the company TSUBAKI KABELSCHLEPP GmbH, D-57482 Wenden-Gerlingen. The steel strip is respectively guided between two side walls of the chain links and is held on the chain links by inwardly projecting retaining lugs of the side walls.

Energy guiding chains serve for the guidance of flexible supply lines, such as, for example, electric cables and pneumatic or hydraulic lines of a moving machine component. The energy guiding chains can be received or laid down at least partially in a guide trough which is recessed into the floor or into a foundation beneath the moving machine component (a so-called underfloor trough).

Energy guiding chains that are installed completely underfloor and are protected or encapsulated by a cover are known. Only the media feed is run to the moving machine component through a floor opening. The open aperture to the energy guiding chain lying beneath the cover is relatively small and can be closed, for example, by brushes. However, for an underfloor-fitted energy guiding chain of this kind, a deep and voluminous foundation is required. In energy guiding chains that are installed in a totally or partially recessed arrangement underfloor or in the floor, there is the danger of dirt collecting in the guide trough, which leads to malfunctions and damage. In use with laser processing machines, there is the danger of laser radiation escaping through the gap between the energy guiding chain and the guide trough thereof into a region that is to be secured if the guide trough is not closed over its full width by a cover at the transition to the region to be secured.

SUMMARY

The energy guiding chains described herein overcome the aforesaid drawbacks. Associated machines that use such energy guiding chains are also described herein. When the new energy guiding chains described herein have been laid down, the danger of escape of laser radiation is minimized, the danger of dirtying an associated guide trough is reduced, and the capacity of the guide trough to be walked on and driven over improved. These advantages are achieved in that a cover strip, in the chain transverse direction, projects at least on one side, or on both sides, over the chain links. As a result of the inventive lateral projection of the cover strip, a gap present between the laid-down energy guiding chain and the guide trough can be at least partially (at least in the region of above-lying enclosure walls/doors), or typically fully, covered, whereby the danger of dirtying the guide through is further reduced and laser safety is further improved.

In some embodiments, guide elements are fastened (e.g., latched) at least to the inner chain links, by which the cover strip is both held and guided displaceably in the chain longitudinal direction. The guide elements typically project in the chain transverse direction on both sides over the chain links and partially surround at least portions of the longitudinal edges of the cover strip, which is hence guided in the chain longitudinal direction. Guide elements can also be fitted (e.g., welded, glued, riveted, or screwed) to the bottom side of the cover strip, or can be formed from the cover strip itself by bending lugs, which respectively engage under a guide edge of the chain links. The guide elements ensure sufficient support for the cover strip (attachment/fixing of the cover strip to the chain) and sufficient tread resistance of the cover strip and of the energy guiding chain. Alternatively, the cover strip can also be held on the chain links by magnets or vacuum elements, and/or the cover strip itself can be magnetic.

The energy guiding chain rests either on the floor of the guided trough or is held suspended in the guide trough via bilaterally protruding marginal projections of its chain links.

The invention also relates to a machine including at least one energy guiding chain, wherein the side covered with the cover strip forms the inner side of a bent-over energy guiding chain and the cover strip is at least as wide as the guide trough. The guide trough is closed as a result of the continuous cover strip of the laid-down energy guiding chain, so that laser safety is improved, and it can be easily walked on or driven over.

In some embodiments, the cover strip of the laid-down energy guiding chain extends in the chain transverse direction on both sides beyond the guide trough to fully cover the gaps between the laid-down energy guiding chain and guide trough, and hence to further reduce the danger of dirtying the guide trough and to further improve laser safety.

Further advantages and advantageous embodiments of the inventions disclosed herein emerge from the description, the claims, and the drawings. Likewise, the aforementioned features and the features that are further cited can be used individually or in plurality in any chosen combinations. The shown and described embodiments should not be construed as a definitive listing, but rather as illustrative. The drawings show the subject according to the invention in schematized representation and should not be thought to be true to scale.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
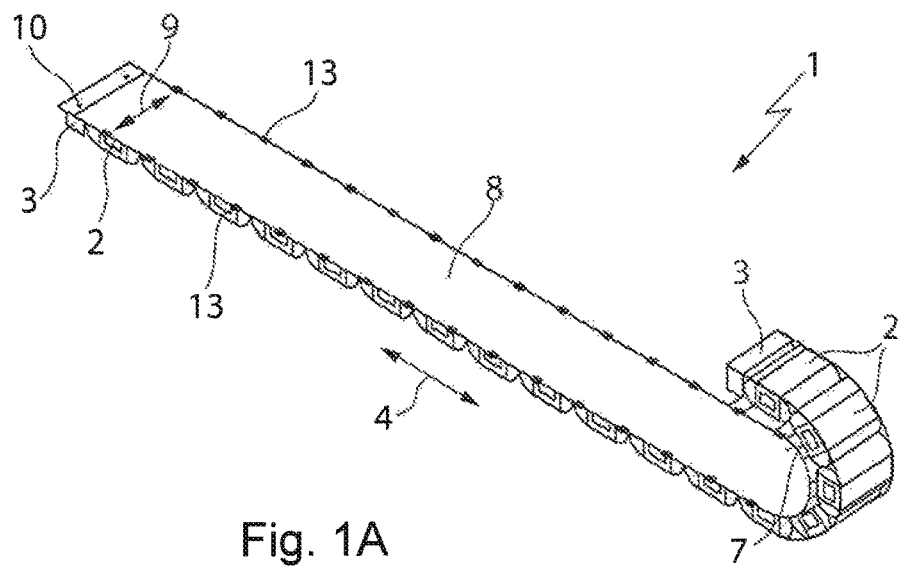
FIGS. 1A, 1B and 1C show perspective, side, and top views of an energy guiding chain, respectively, bent in a U-shape, with a cover strip.
Figure 1B:
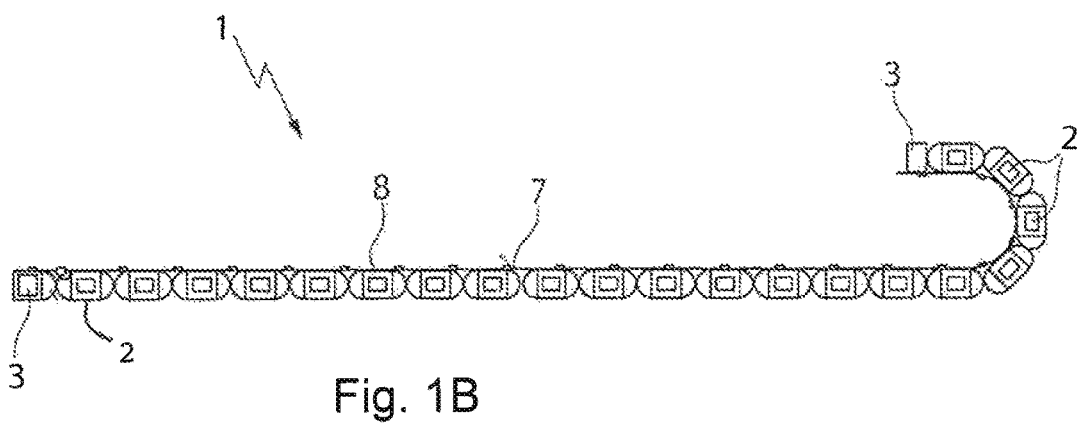
Figure 1C:
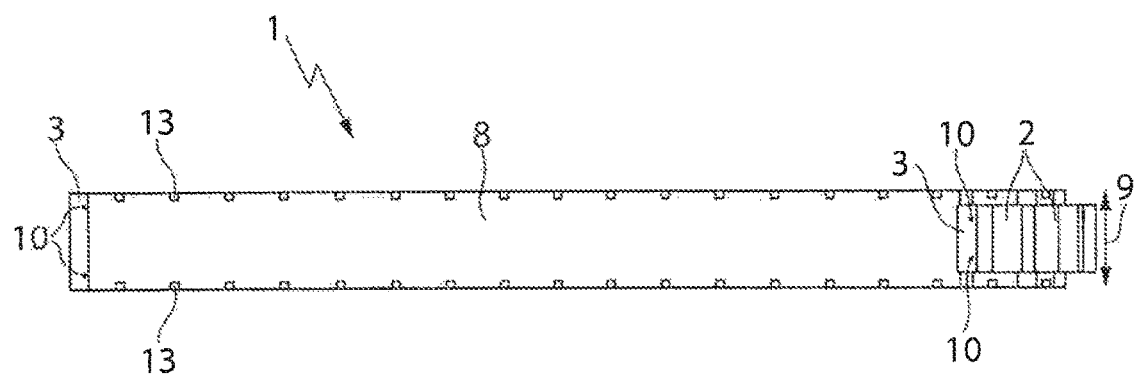

The energy guiding chain 1 shown in FIGS. 1A-C serves to guide flexible supply lines, such as, for example, electric cables and pneumatic or hydraulic lines, of a moving machine part.

Figure 5A:
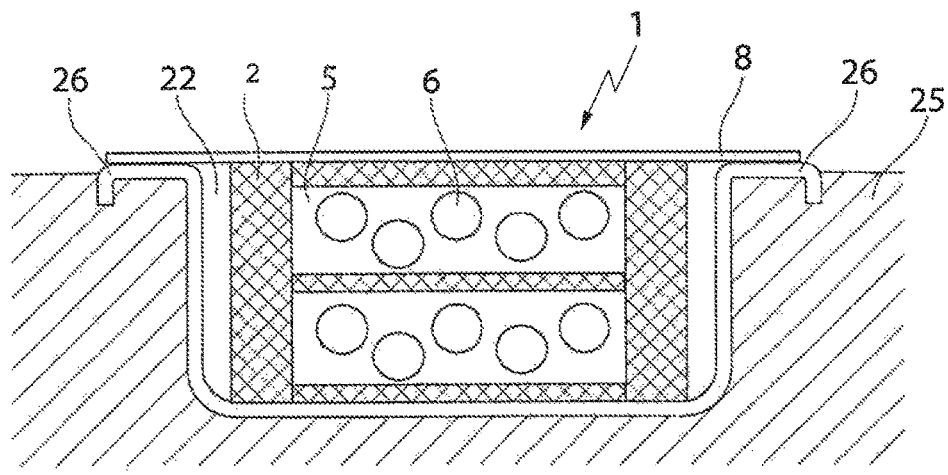
FIGS. 5A and 5B show a cross-sectional view V-V in FIG. 4 of an energy guiding chain resting on the bottom of the guide trough (FIG. 5A), and an energy guiding chain held suspended on the guide trough (FIG. 5B), respectively.
Figure 5B:
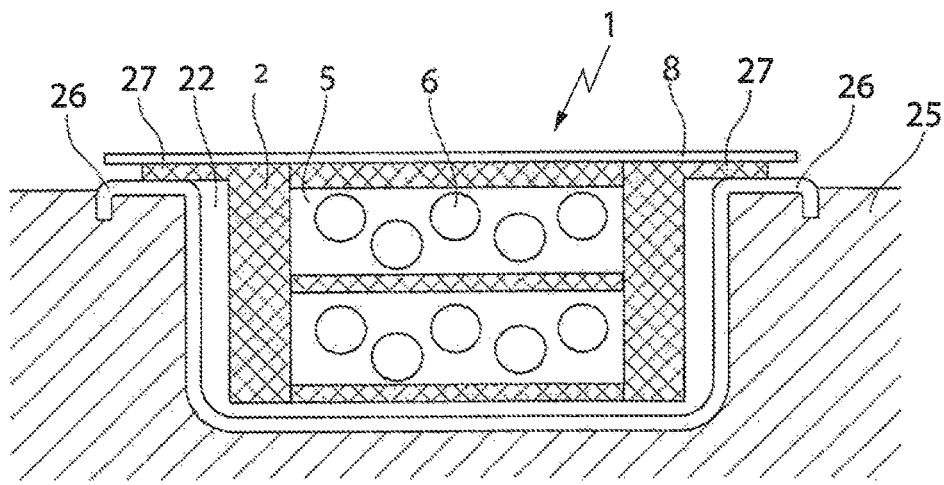

The energy guiding chain 1 includes a plurality of articulately interconnected chain links 2, 3. Referring as well to FIGS. 5A and 5B, the chain links 2, 3 have a hollow profile 5 which is open in the chain longitudinal direction 4 and in which the supply lines 6 are guided in the chain longitudinal direction 4. The two outermost chain links are denoted by 3 and the intervening inner chain links by 2.

One of the two sides of the energy guiding chain 1, which in FIG. 1 is bent over in a U-shape on the inner side 7, is covered with an elastically bendable cover strip 8, for example in the form of a spring steel strip. The cover strip 8 is both held on all inner chain links 2 and is guided displaceably in the chain longitudinal direction 4. This guidance is realized such that a relative movement of the cover strip 8 along the energy guiding chain 1 is possible, as the cover strip 8 fastened outside the neutral axis of the energy guiding chain 1 must be able to move relative to the energy guiding chain 1 in the transition to the bending radius. The total length of the inner side 7 remains unaltered, so that the cover strip 8 can be fixed to the two outermost chain links 3. This fixing can be realized, for instance, via screws or rivets 10. Alternatively, the cover strip 8 can also be fixed only to one of the two outermost chain links 3, or else, insofar as the cover strip 8 is freely displaceable between end stops of the outermost chain links 3, not fixed. As shown particularly clearly in FIG. 1C, the cover strip 8 projects in the chain transverse direction 9 on both sides over the chain links 2, 3. Alternatively, the cover strip 8 can also project in the chain transverse direction 9 only on one side over the chain links 2, 3. When used in a laser processing machine, the cover strip 8 consists of laser-light-resistant material.

Figure 2:
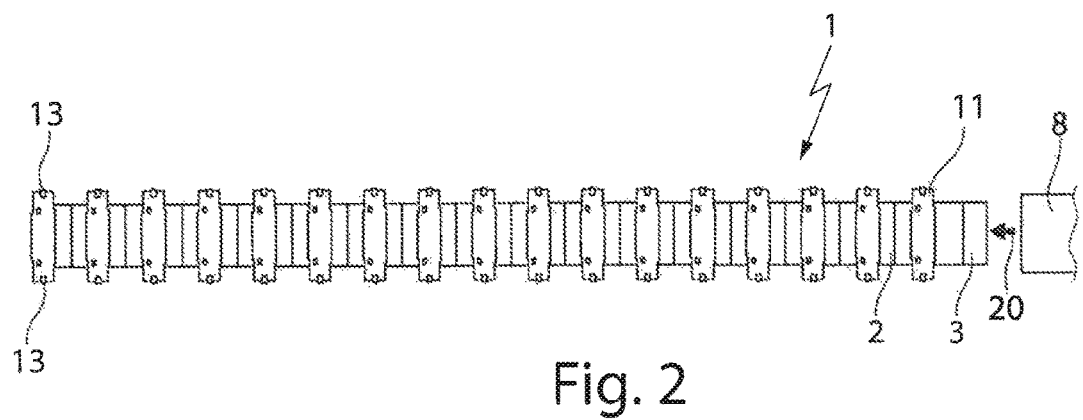
FIG. 2 shows a top view of the rolled-out (e.g., not bent) energy guiding chain without the cover strip to show guide elements.
Figures 3A, 3B:
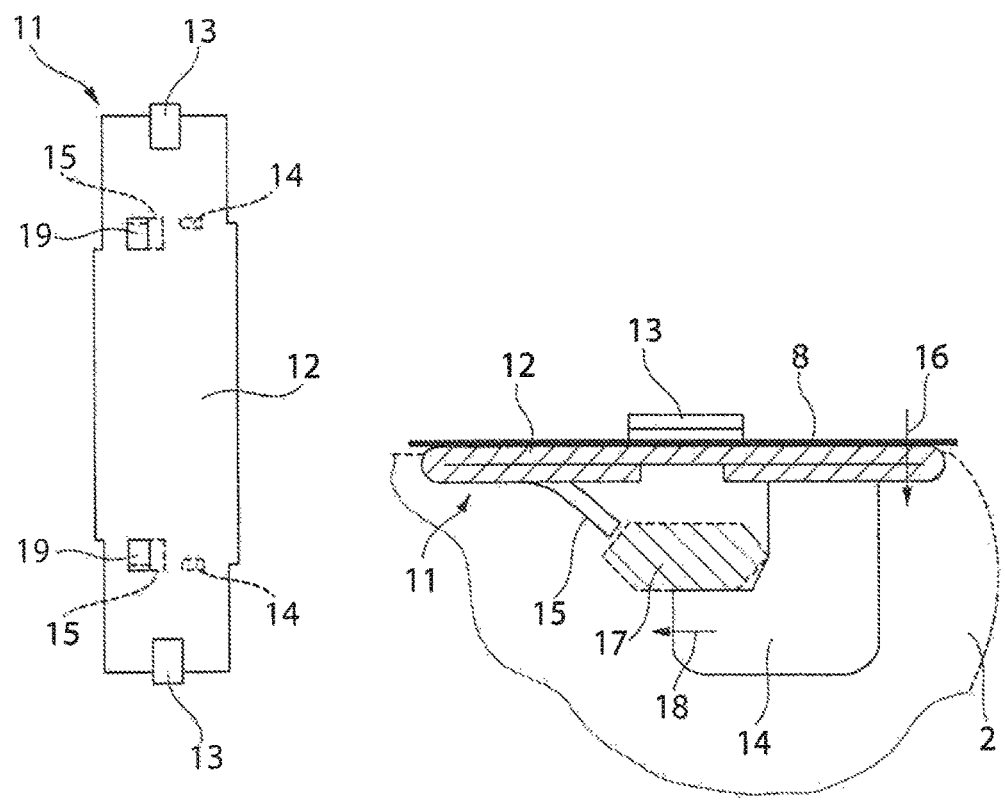
FIGS. 3A and 3B show a top view (FIG. 3A) and a side view (FIG. 3B), respectively, of a guide element shown in FIG. 2.

As shown in FIG. 2, guide elements 11 are fastened to the inner chain links 2 and hold and guide the cover strip 8 displaceably in the chain longitudinal direction 4. As shown in FIGS. 3A and 3B, the guide element 11 has a floor portion 12 for placement on a chain link 2, and retaining lugs 13, which are bent upward in the chain transverse direction 9 at both ends of the floor portion 12 and which engage over the floor portion 12. In addition, the guide element 11 has two bottom hooks 14, which are spaced apart in the chain transverse direction 9, and two downwardly protruding fixing lugs 15, which are respectively facing towards the hook openings of the hooks 13. The guide element 11 can be made from a flat sheet-metal blank, so the cut-free tabs of the sheet-metal blank are bent over to form the retaining lugs 13 and are angled off to form the hooks 14 and fixing lugs 15. Alternatively, the guide element 11 can also be a metal or plastics casting. The guide elements 11 ensure sufficient support for the cover strip 8 and sufficient tread resistance of cover strip 8 and energy guiding chain 1.

As shown in FIG. 3B, the guide element 11 is inserted with its two hooks 14 from above in the arrow direction 16, next to a transverse tube 17 of the chain link 2, into the chain link 2, to the point where the floor portion 12 rests on the chain link 2 and the fixing lugs 15 are upwardly deflected on the transverse tube 17. After this, the guide element 11 is pushed on the chain link 2 in the arrow direction 18 to the point where the hooks 14 bear against the transverse tube 17 and the fixing lugs 15 are latched behind the transverse tube 17. The guide element 11 is now fastened on the transverse tube 17. For the release of the guide element 11, the fixing lugs 15 are raised, and hence unlatched, by a suitable tool, which is introduced through cut-outs 19 in the floor portion 12 to under the fixing lugs 14.

Once the guide elements 11 are fastened to all inner chain links 2, the cover strip 8 is slipped via one of the two chain ends, respectively between floor portion 12 and retaining lugs 13, onto all guide elements 11, as is indicated in FIG. 2 by the arrow 20. Finally, the cover strip 8 is fixed in a non-displaceable manner to the two outermost chain links 3 by screws or rivets 10.

Figure 4:
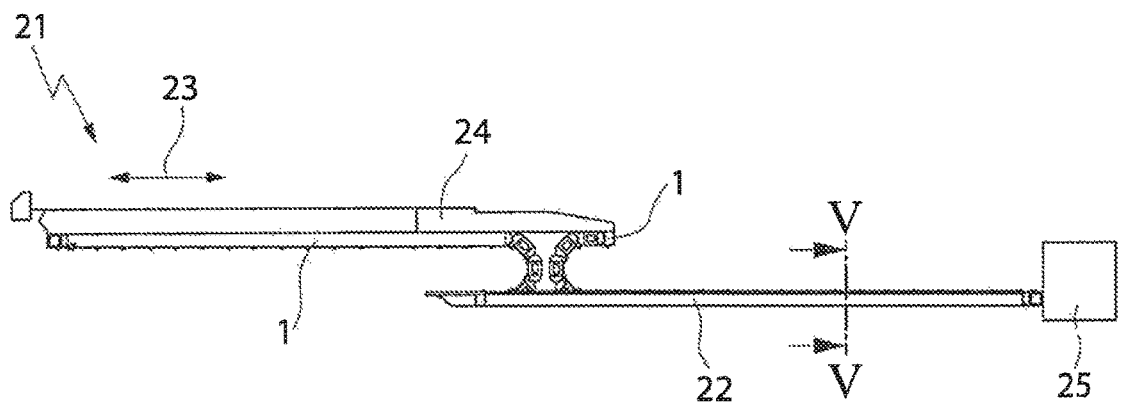
FIG. 4 is a schematic representation of a processing machine with a machine component transportable along a guide trough and with two energy guiding chains that can be laid down in the guide trough.

The machine 21 shown in FIG. 4 includes a machine component 24 transportable horizontally (in arrow direction 23) along a straight guide trough 22 and having two energy guiding chains 1 bent over in a U-shape. One energy guiding chain 1 is connected to a stationary machine component (for example a supply source) 25 and the other fills and covers the guide trough 22. For example, the machine 21 can be a processing machine for the machining of workpieces, such as, for example, a laser processing machine. In FIG. 4 one energy guiding chain 1 is fastened to the left end, and the other energy guiding chain 1 is fastened to the right end of the transportable machine component 24. The transportable machine component 24 is, for instance, a slide with rollers which are guided in the guide trough 22. The two energy guiding chains 1 are laid down in opposite-running arrangement in the guide trough 22, wherein, in dependence on the current transport position of the transportable machine component 24, larger or smaller parts of the energy guiding chains 1 are laid down in the guide trough 22.

FIG. 5A shows a cross section through a chain link 2, 3 (with chain link 2 shown as an example) laid down into the guide trough 22, wherein the guide trough 22 is represented, by way of example, as a rail profile laid in a floor 25. The guide trough 22 is at most as deep as the chain links 2, 3 are high, so that the laid-down chain link 2, 3 rests on the floor of the guide trough 22. The inner side 7 of the energy guide 1 covered with the cover strip 8 is bent over in a U-shape and forms the top side of the laid-down chain link 2, 3. The cover strip 8 extends on both sides beyond the guide trough 22, to cover the gaps respectively present between laid-down energy guiding chain 1 and guide trough 22, further reducing the danger of dirtying and further improving laser safety. The cover strip 8 can project, instead of on both sides, only on one side over the chain links 2, 3, so that only one of the two gaps is covered. As shown in FIG. 5A, the cover strip 8 rests on shoulders 26 of the guide trough 22. The cover strip 8 constitutes a tread-resistant cover of the laid-down energy guiding chain 1 and prevents laser radiation from escaping freely from the machining chamber through the guide trough 22 into a region to be secured.

As shown in FIG. 5B, the chain links 2, 3 can also have bilaterally projecting marginal projections 27, by which the laid-down chain link 2, 3 is held suspended on the shoulders 26 of the guide trough 22. Here too, the cover strip 8 extends on both sides beyond the guide trough 22 to form a tread-resistant cover of the laid-down energy guiding chain 1 and prevent laser radiation from freely escaping from the machining chamber through the guide trough 22 into a region to be secured.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. An energy guiding chain with two free chain ends comprising:
    two outermost chain links forming the two free chain ends and a plurality of inner chain links having a width, wherein the two outermost and the inner chain links are articulately interconnected in a manner permitting the energy guiding chain to bend into a U-shape;
    a bendable cover strip covering the articulately interconnected chain links on at least one of an inner side and an outer side of the U-shaped energy guiding chain, wherein the cover strip is held by at least some of the inner chain links, and guided displaceably with respect to at least the inner chain links in a chain longitudinal direction, and wherein the cover strip projects in a direction transverse to the chain longitudinal direction at least on one side beyond the width of the chain links; and
    guide elements fastened to at least some of the inner chain links to hold and guide the cover strip displaceably in the chain longitudinal direction, wherein the cover strip comprises longitudinal edges and the guide elements project in the chain transverse direction on both sides beyond the width of the chain links and partially surround the longitudinal edges of the cover strip.

2. The energy guiding chain according to claim 1, wherein the cover strip projects in the chain transverse direction over the chain links on both sides.

3. The energy guiding chain according to claim 1, wherein the cover strip is held by all of the inner links.

4. The energy guiding chain according to claim 1, wherein the cover strip is made of a laser-light-resistant material.

5. The energy guiding chain according to claim 1, wherein the cover strip comprises a spring steel strip.

6. An energy guiding chain with two free chain ends comprising:
    two outermost chain links forming the two free chain ends and a plurality of inner chain links having a width, wherein the two outermost and the inner chain links are articulately interconnected-in a manner permitting the energy guiding chain to bend into a U-shape; and
    a bendable cover strip covering the articulately interconnected chain links on at least one of an inner side and an outer side of the U-shaped energy guiding chain, wherein the cover strip is held by at least some of the inner chain links, and guided displaceably with respect to at least the inner chain links in a chain longitudinal direction, and wherein the cover strip projects in a direction transverse to the chain longitudinal direction at least on one side beyond the width of the chain links, wherein the chain links have protruding marginal projections on both sides in the chain transverse direction configured for suspended placement of the chain links.

7. The energy guiding chain according to claim 1, wherein the chain links have a hollow profile configured to guide supply lines in the chain longitudinal direction.

8. A processing machine for the machining of workpieces, comprising:
    an energy guiding chain with two free chain ends comprising:
        two outermost chain links forming the two free chain ends and a plurality of inner chain links having a width, wherein the two outermost and the inner chain links are articulately interconnected in a manner permitting the energy guiding chain to bend into a U-shape having inner and outer sides; and
        a bendable cover strip covering the inner side of the articulately interconnected chain links, the cover strip being held by at least some of the inner chain links, and guided displaceably with respect to at least the inner chain links in a chain longitudinal direction, wherein the cover strip projects in a direction transverse to the chain longitudinal direction beyond the width of the chain links at least on one side;
    a guide trough comprising a bottom floor and two shoulders on either side of the floor;
    a supply machine component; and
    a transportable machine component that is transportable along the guide trough and is connected to the supply machine component by the energy guiding chain, wherein the energy guiding chain is at least partially received in the guide trough and partially bent in the U-shape, and wherein the cover strip is at least as wide as the guide trough.

9. The processing machine according to claim 8, wherein the cover strip of the energy guiding chain extends in the chain transverse direction on both sides beyond the guide trough, and rests on the shoulders of the guide trough.

10. The processing machine according to claim 8, wherein the chain links have marginal projections that project beyond the width on both sides in the chain transverse direction and with which the energy guiding chain rests on the shoulders of the guide trough.

11. The processing machine according to claim 8, wherein the chain links have marginal projections that project on both sides in the chain transverse direction and the projections suspend the energy guiding chain in the guide trough.

12. The processing machine according to claim 8, wherein the energy guiding chain rests on the floor of the guide trough.

13. A method of safely guiding flexible supply lines of a moving machine component, the method comprising:
    enclosing the supply lines in an energy guiding chain with two free chain ends comprising two outermost chain links forming the two free chain ends and a plurality of inner chain links having a width, wherein the two outermost and the inner chain links are articulately interconnected in a manner permitting the energy guiding chain to bend into a U-shape and having a hollow profile; and
    securing an elastically bendable cover strip to the chain links at one of an inner and an outer side of the U-shape, the cover strip being held by at least some of the inner chain links, and guided displaceably in a chain longitudinal direction, wherein the cover strip projects in a direction transverse to the longitudinal chain direction beyond the width of the chain links at least on one side.

14. The method of claim 13, further comprising connecting a transportable machine component that is transportable along a guide trough to another machine component by the energy guiding chain, wherein the energy guiding chain is laid down at least partially in the guide trough, and wherein the side covered with the cover strip forms the inner side of the U-shape and the cover strip is at least as wide as the guide trough in the transverse chain direction.

\* \* \* \* \*

UNITED STATES PATENT AND TRADEMARK OFFICE
CERTIFICATE OF CORRECTION

PATENT NO. : 9,982,752 B2
APPLICATION NO. : 15/678693
DATED : May 29, 2018
INVENTOR(S) : Martin Blaser et al.

It is certified that error appears in the above-identified patent and that said Letters Patent is hereby corrected as shown below:

On the Title Page

Column 1 (Assignee), Line 1, delete "Laser—und" and insert -- Laser- und --

Column 1 (Notice), Line 3, after "0 days." delete "days."

Signed and Sealed this
Tenth Day of July, 2018

Andrei Iancu
*Director of the United States Patent and Trademark Office*